(12) United States Patent
Morris et al.

(10) Patent No.: US 8,867,345 B2
(45) Date of Patent: Oct. 21, 2014

(54) INTELLIGENT ELECTRONIC DEVICE WITH SEGREGATED REAL-TIME ETHERNET

(75) Inventors: Robert E. Morris, Viola, ID (US); Tony J. Lee, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 260 days.

(21) Appl. No.: 12/562,224

(22) Filed: Sep. 18, 2009

(65) Prior Publication Data

US 2011/0069718 A1   Mar. 24, 2011

(51) Int. Cl.
| | |
|---|---|
| H04J 1/16 | (2006.01) |
| H04L 12/28 | (2006.01) |
| H04L 12/56 | (2006.01) |
| H04B 7/212 | (2006.01) |
| B23K 11/24 | (2006.01) |
| H01F 17/00 | (2006.01) |
| G05D 3/12 | (2006.01) |
| H04L 12/931 | (2013.01) |

(52) U.S. Cl.
CPC ......... H01L 12/40143 (2013.01); H04L 49/351 (2013.01)
USPC ........... 370/230; 370/412; 370/416; 370/444; 323/318; 323/355; 700/286; 700/292

(58) Field of Classification Search
CPC ..... H04L 47/24; H04L 47/6275; H04L 49/90; H04L 49/205; H02J 3/00; H02J 13/0006; H02H 3/00
USPC ............... 370/217, 227, 254, 395.21, 395.42, 370/230, 412, 416, 444; 323/318, 355; 700/286, 292
See application file for complete search history.

(56) References Cited

U.S. PATENT DOCUMENTS

| | | |
|---|---|---|
| 4,535,306 A | 8/1985 | Yamaguchi |
| 4,546,486 A | 10/1985 | Evans |
| 4,768,178 A | 8/1988 | Conklin |
| 4,808,884 A | 2/1989 | Hull |

(Continued)

FOREIGN PATENT DOCUMENTS

| | | |
|---|---|---|
| GB | 2278519 | 11/1994 |
| JP | 10247377 | 9/1998 |

(Continued)

OTHER PUBLICATIONS

PCT/US2010/049169 Patent Cooperation Treaty Notification of Transmittal of the International Search Report and the Written Opinion, International Search Report, and Written Opinion, Nov. 5, 2010.

(Continued)

Primary Examiner — Un C Cho
Assistant Examiner — Jeremy Costin
(74) Attorney, Agent, or Firm — Richard M. Edge

(57) ABSTRACT

An intelligent electronic device segregates urgent data frames from non-urgent data frames on reception so that the urgent data frames may be handled with greater priority. A switching device is disposed between an external network interface and multiple internal network ports. Based on a network data type indicia, urgent data frames are routed to one of the ports, and non-urgent data frames are routed to another port. A processor coupled to the internal network ports handles urgent data frames before handling any non-urgent data frames.

23 Claims, 5 Drawing Sheets

(56) References Cited

U.S. PATENT DOCUMENTS

| | | | |
|---|---|---|---|
| 5,103,466 A | | 4/1992 | Bazes |
| 5,235,590 A | | 8/1993 | Taguchi |
| 5,363,377 A | | 11/1994 | Sharpe |
| 5,596,263 A | * | 1/1997 | Zavis et al. .................. 323/255 |
| 5,793,869 A | | 8/1998 | Claflin |
| 6,456,831 B1 | | 9/2002 | Tada |
| 6,577,628 B1 | * | 6/2003 | Hejza .......................... 370/392 |
| 6,678,134 B2 | | 1/2004 | Sugiura |
| 6,754,210 B1 | | 6/2004 | Ofek |
| 6,847,691 B2 | | 1/2005 | Torikoshi |
| 6,859,742 B2 | | 2/2005 | Randall |
| 6,891,441 B2 | | 5/2005 | Rochow |
| 6,937,683 B1 | | 8/2005 | Ratzel |
| 6,947,269 B2 | | 9/2005 | Lee |
| 7,239,581 B2 | | 7/2007 | Delgado |
| 7,272,201 B2 | | 9/2007 | Whitehead |
| 7,283,568 B2 | | 10/2007 | Robie |
| 7,463,467 B2 | | 12/2008 | Lee |
| 7,571,216 B1 | | 8/2009 | Mcrae |
| 7,617,408 B2 | | 11/2009 | Frazier |
| 7,701,683 B2 | | 4/2010 | Morris |
| 8,351,433 B2 | | 1/2013 | Morris |
| 2001/0023464 A1 | | 9/2001 | Deck |
| 2002/0069299 A1 | | 6/2002 | Rosener |
| 2002/0080808 A1 | | 6/2002 | Leung |
| 2004/0196855 A1 | | 10/2004 | Davies |
| 2007/0002746 A1 | | 1/2007 | Shankar |
| 2007/0127487 A1 | | 6/2007 | Kim |
| 2007/0147415 A1 | | 6/2007 | Marusca |
| 2008/0005484 A1 | | 1/2008 | Joshi |
| 2008/0071482 A1 | | 3/2008 | Zweigle |
| 2008/0189784 A1 | * | 8/2008 | Mangione-Smith et al. ... 726/23 |
| 2008/0219186 A1 | * | 9/2008 | Bell et al. ...................... 370/254 |
| 2008/0235355 A1 | | 9/2008 | Spanier |
| 2009/0141727 A1 | | 6/2009 | Brown |
| 2009/0160189 A1 | * | 6/2009 | Rasmussen .................... 290/44 |
| 2009/0180477 A1 | * | 7/2009 | Akahane ....................... 370/392 |
| 2009/0260083 A1 | | 10/2009 | Szeto |
| 2009/0300165 A1 | | 12/2009 | Tuckey |
| 2010/0195763 A1 | | 8/2010 | Lee |
| 2010/0251134 A1 | | 9/2010 | Van Seggelen |
| 2011/0022666 A1 | | 1/2011 | Pinto |
| 2011/0069709 A1 | | 3/2011 | Morris |
| 2012/0005326 A1 | | 1/2012 | Bradetich |
| 2012/0078555 A1 | | 3/2012 | Banhegyesi |
| 2013/0018521 A1 | | 1/2013 | Manson |

FOREIGN PATENT DOCUMENTS

| | | |
|---|---|---|
| JP | 2001221871 | 8/2001 |
| JP | 2001221874 | 8/2001 |
| WO | 0057527 | 9/2000 |
| WO | 0016525 | 3/2001 |
| WO | 2005088911 | 9/2005 |

OTHER PUBLICATIONS

D.L. Mills, Experiments in Network Clock Synchronization, Network Working Group Request for Comments: 957, Sep. 1985.

D. Mills, Simple Network Time Protocol (SNTP) Version 4 for IPv4, IPv6, and OSI, Network Working Group Request for Comments: 4330, Jan. 2006.

PCT/US2014/016955 Patent Cooperation Treaty, International Search Report and Written Opinion of the International Searching Authority, Jun. 5, 2014.

Roy Moxley, Ken Fodero, and Hector J. Altuve, Updated Transmission Line Protection Communications, IEEE, Oct. 2008.

James W. Rice, Sam Fulford, and Nicholas C. Seeley, Improved Service Reliability for Rural Electric Customers—Innovative Auto-Restoration Following Loss of Primary Source Interconnection, Sep. 2006.

Nicholas C. Seeley, Automation at Protection Speeds: IEC 61850 Goose Messaging as a Reliable, High-Speed Alternative to Serial Communications, Feb. 2008.

S. Ward, W. Higinbotham, E. Duvelson, Inside the Cloud—Network Communications Basics for the Relay Engineer, 34th Annual Western Protective Relay Conference, Oct. 2007.

Daqing Hou, Dave Dolezilek, IEC 61850—What It Can and Cannot Offer to Traditional Protection Schemes, Sep. 2008.

PCT/US2011/039498 Patent Cooperation Treaty, International Search Report and Written Opinion of the International Searching Authority, Oct. 21, 2011.

W. Kleinebreg, ABB Switzerland Ltd., Hirschmann Automation & Control GmbH, IEC 61850 Modeling of Switches, Dec. 2009.

PCT/US2014/023169 Patent Cooperation Treaty, International Search Report and Written Opinion of the International Searching Authority, Aug. 19, 2014.

* cited by examiner

_US 8,867,345 B2_

INTELLIGENT ELECTRONIC DEVICE WITH SEGREGATED REAL-TIME ETHERNET

CROSS-REFERENCE TO RELATED APPLICATIONS

None

FIELD OF THE INVENTION

The present invention relates generally to apparatus and methods for communicating data to and from an intelligent electronic device and more particularly to apparatus and methods of segregating urgent communications from non-urgent communications within an intelligent electronic device, so that the urgent communications can be dealt with more promptly.

DESCRIPTION OF THE PRIOR ART

The modern power grid utilizes a sophisticated network of Intelligent Electronic Devices ("IEDs") to ensure proper operation. For example, IEDs commonly monitor various power line quantities, such as voltage and current, to ensure that a given power line segment has not become faulted. When a power line segment has been faulted, the IED monitoring that segment will cause a circuit breaker or other form of switchgear to operate to isolate the offending power line segment. When an IED makes a determination to isolate a power line segment, in some circumstances it may also send a communication to another IED to complete the isolation of the power line segment from the power grid.

In addition to control data, such as that described above, IEDs commonly communicate other data to one another and other devices involved in power protection and control systems. IED communications have become sophisticated enough that they use a wide variety of protocols. Generally, however, IEDs utilize a single network connection, such as an Ethernet connection. While the use of a single connection provides many advantages, such as lower wiring, equipment, testing and labor costs, it also presents certain challenges.

A network switch is a computer networking device that connects network segments or endpoints. Network switches come in a variety of types, such as Token Ring, Fibre Channel, and Ethernet, and can also be used to connect varying types of network segments. An Ethernet switch is a network switch that connects various Ethernet endpoints or network segments together.

An Ethernet switch operates by saving the originating MAC addresses of received frames, as well as the port on which a frame was received in the switch's MAC address table. A switch will then selectively transmit to an alternate port based on the frame's destination MAC address and previous entries in the MAC address table. If a destination MAC address is unknown, a broadcast address, or a multicast address, the switch will transmit the frame out of all connected ports except for the one it was received on. One last special case is where the destination MAC address is the same as the originating MAC address, where the switch will simply filter the frame out.

Most importantly, as described above, certain communications are more urgent than other communications. For example, control data or real time samples may only have value for a limited period of time, and, accordingly, can be said to be more urgent than setup data from an administrator, which may have value of a more permanent nature. For example, an IED may receive urgent control data using IEC 61850 GOOSE (Generic Object Oriented System Event), or preferably Mirrored Bits®. The use of one physical connection makes it difficult for an IED to discriminate between urgent data and non-urgent data. Generally, the network stack looks at data in the order that it is received.

One prior art solution that IEDs have employed is for an IED to incorporate a custom network stack that "snoops" received data frames for urgent data, and processes those frames first. While this approach allows more urgent data to be handled first it comes: i) at the cost of significant processor time as it must search through received data, and, ii) complexity in the form of a custom software stack.

OBJECTS OF THE INVENTION

Accordingly, it is an object of this invention to provide an Intelligent Electronic Device and method for handling urgent received data on a priority basis.

Another object of the invention is to provide an Intelligent Electronic Device and method for handling urgent received data on a priority basis without significantly increasing processor load.

Other advantages of the disclosed invention will be clear to a person of ordinary skill in the art. It should be understood, however, that a system, method, or apparatus could practice the disclosed invention while not achieving all of the enumerated advantages, and that the protected invention is defined by the claims.

SUMMARY OF THE INVENTION

The disclosed invention achieves its objectives by providing an intelligent electronic device as well as a method operating within an intelligent electronic device ("IED") to optimize the handling of network data. Network data is received on an external network interface from, for example, another IED. The network data is examined for a network data type indicia and based on the network data type indicia, the data is routed to a first internal network port or a second internal network port, where urgent data is routed to the first internal network port and non-urgent data is routed to the second internal network port.

In one embodiment, data may be routed to urgent and non-urgent ports based on the network address that originated a particular frame of data. For example, in an Ethernet system, the originating or destination MAC address may serve as a network data type indicia to distinguish between urgent and non-urgent Ethernet frames. Such an embodiment may utilize an Ethernet switch internal to the IED to route data to Ethernet ports within the IED.

In another embodiment, the underlying protocol that a frame adheres to may be used as a network data type indicia, and cause data to be routed to urgent and non-urgent ports. For example, IEC-61850 GOOSE data or Mirrored Bits® data may be routed to the urgent port, while other data may be routed to the non-urgent port.

In another embodiment that is particularly well-suited to be employed within broadcast networks, such as Ethernet, a packet filtering circuit may be employed. The packet filtering circuit may be advantageously disposed between the external network connection and the first internal network port, and will examine all received urgent frames to filter out those frames that are directed to a different IED. This will prevent a processing device from spending processing time servicing urgent communications directed to a different IED.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
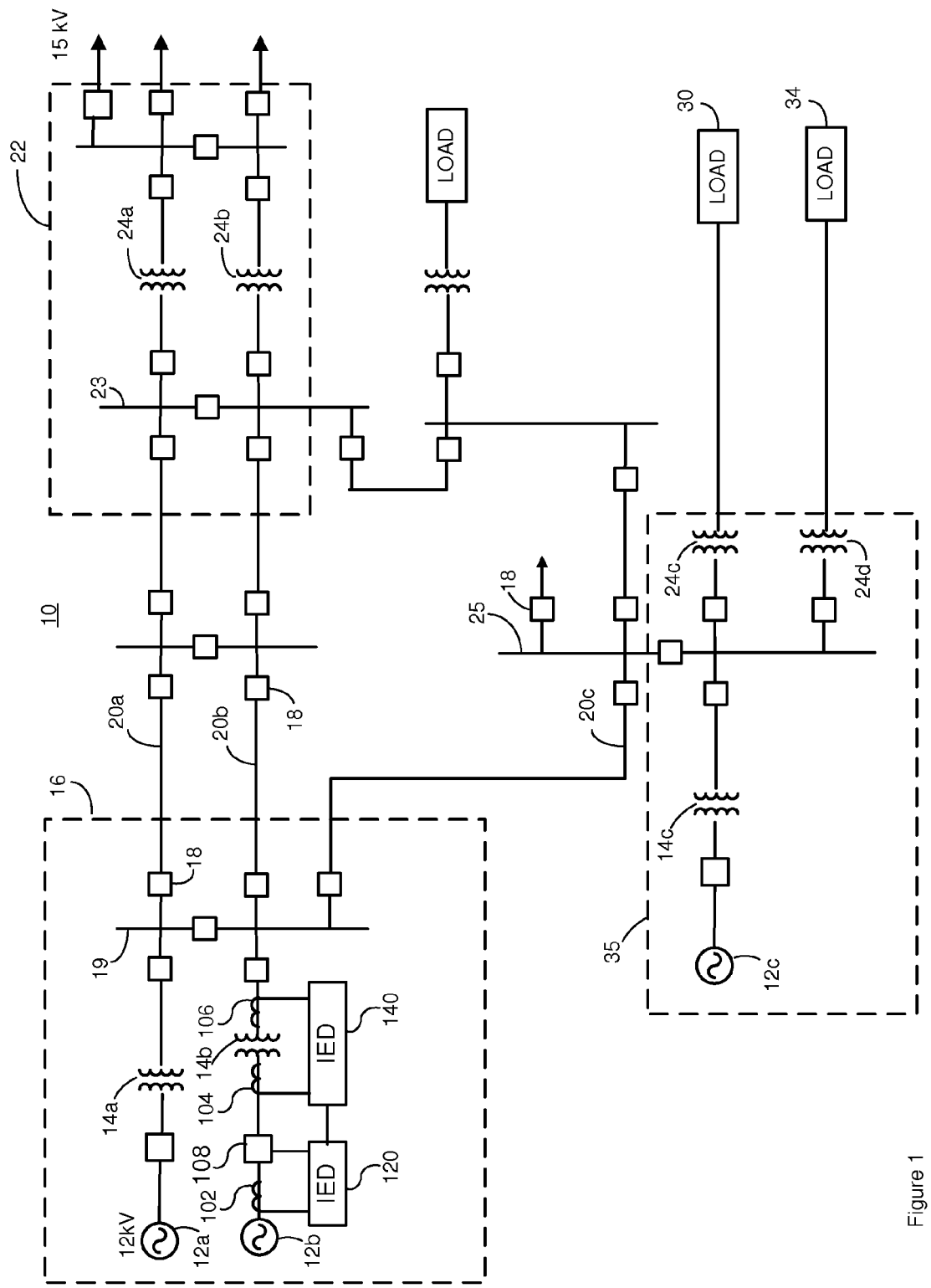
FIG. 1 is a simplified line schematic diagram of an electrical power distribution system illustrating the use of intelligent electronic devices supervising a power grid.

Turning to the Figures, and to FIG. 1 in particular, a power distribution system 10 includes, among other components, a pair of generators 12a and 12b configured to generate three-phase sinusoidal power waveforms, such as, for example, 12 kV AC waveforms. Generally, each generator will be protected by a circuit breaker; for example, generator 12b is protected by circuit breaker 108, which is controlled by IED 120. Also included are step up transformers 14a and 14b which are configured to increase the generated waveforms to higher voltage sinusoidal waveforms such as, for example, 138 kV AC waveforms. Generally, each step up transformer will be protected by a pair of circuit breakers; for example, step up transformer 14b is protected by circuit breakers, which are controlled by IED 140. The step up transformers operate to provide higher voltage waveforms to long distance transmission lines 20a and 20b. As illustrated the generators and step up transformers are part of a substation 16 and can be interconnected by a bus 19 through the operation of a circuit breaker that is depicted but not numbered.

A second substation 22 is depicted as including two step down transformers 24a and 24b that are configured to transform the higher voltage waveforms transported by the long distance transmission lines 20a and 20b to a waveform that is more suitable for distribution to a load, such as, for example, 15 kV AC. A bus 23 can interconnect different distribution lines through the operation of a circuit breaker that is depicted but not numbered.

A third substation 35 is depicted as including a third generator 12c as well as an additional step up transformer 14c, and two step down transformers 24c and 24d that connect to loads 30 and 34 respectively. A bus 25 can interconnect the third substation 35 to the rest of the power distribution system through transmission line 20c by operating a circuit breaker that is depicted but not numbered.

Figure 2:
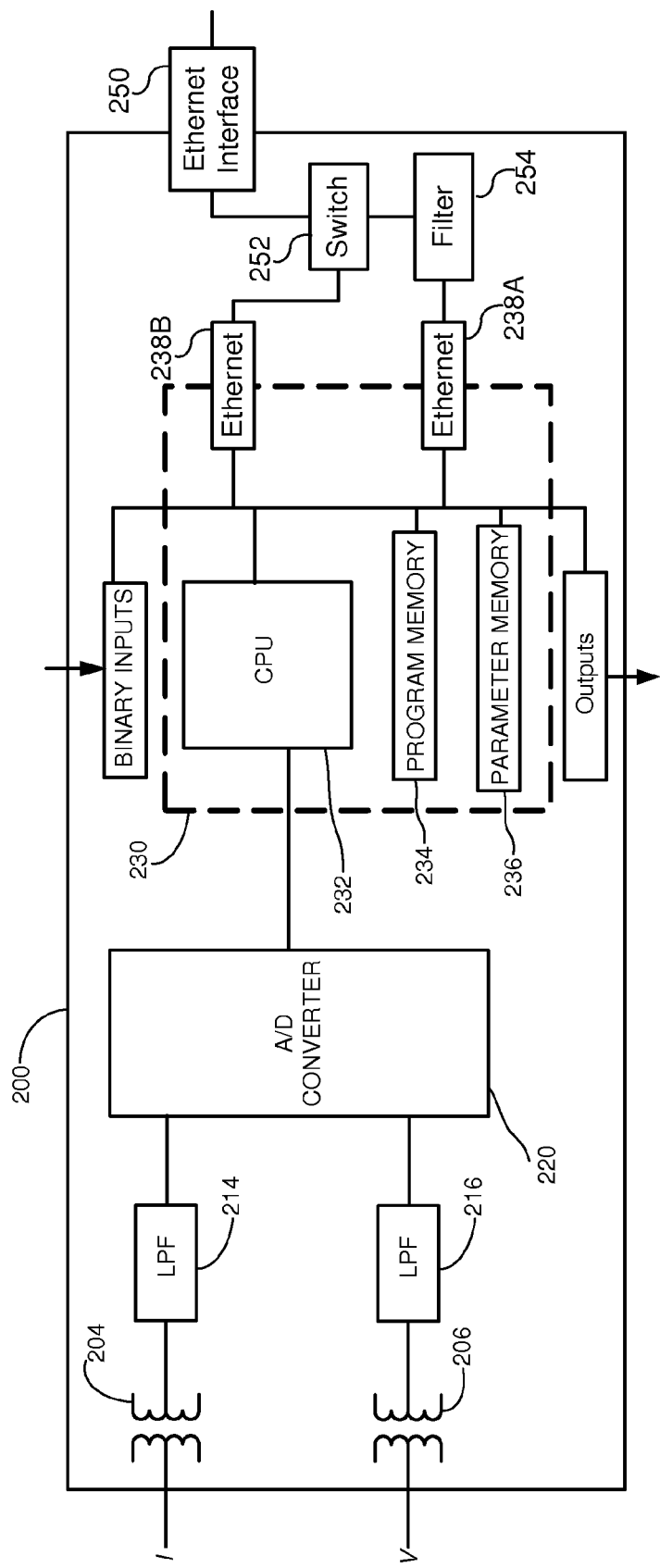
FIG. 2 is a block diagram of an intelligent electronic device that segregates network data in accordance with this disclosure.

FIG. 2 depicts an IED 200 integrating a network data segregating scheme in accordance with this disclosure. A microcontroller 230 incorporates a CPU 232, program memory 234, which could be FLASH memory or electrically-erasable ROM, and parameter memory 236, which could be static RAM or dynamic RAM. As depicted the IED 200 examines one channel of current, which is acquired by current transformer 204, low pass filter 214, and A/D converter 220. The IED also examines one channel of voltage through potential transformer 206, low pass filter 216, and A/D converter 220. In addition, IED 200 accepts a number of binary inputs, and produces a number of outputs, such as contact closures to control a circuit breaker. Persons of skill in the art will understand that this is a simplified view of an IED, which generally will examine numerous line parameters including multiple current and voltage channels, as well as incorporate many other functions.

An external Ethernet interface 250 is adapted to communicate with other IEDs and other devices used within the power grid, such as monitoring stations (not depicted). A switching device 252 examines Ethernet frames that are received via Ethernet interface 250 and routes the received frames down one of two paths based on a network data type indicia contained within each frame. A first path handles urgent communications, which are routed through filtering device 254 to a first Ethernet port 238A. It should be noted that filtering device 254, which is discussed in detail later in this disclosure, is a beneficial but non-essential component of IED 200. A second path handles non-urgent communications, which are routed to a second Ethernet port 238B. The particular operation of switching device 252 is explained below.

Switching device 252 examines Ethernet frames received by Ethernet port 250 to determine if a particular frame is of an urgent or non-urgent nature. To accomplish this, the switching device 252 examines each received frame for a network data type indicia. One possible indicia of urgent network data is the source of the communications; within a particular power grid, certain devices, such as other IEDs, are more likely to source urgent communications than other devices, such as monitoring computers. Another possible indicia of urgent network data is the destination of the communications, as certain destination addresses, such as multicast or broadcast addresses, can indicate that the data is urgent network data. Accordingly, one way that switching device 252 can make this determination is to use the MAC address from which each Ethernet frame originated or to which the Ethernet frame is destined as a network data type indicia, and then routing those frames received by urgent communications sources, such as other IEDs, to the urgent communications path, while routing non-urgent communications to the communications path intended for non-urgent communications. In an implementation adapted to take advantage of Ethernet MAC addresses, switching device 252 could be an Ethernet switch integrated circuit.

Another way to determine if a communication is of an urgent nature is to examine the contents of the data to determine what protocol the data is communicating over, and use the underlying protocol as a network data type indicia. For example, if a particular Ethernet frame contains IEC-61850 GOOSE data, it is likely that the data is of an urgent nature. In an implementation adapted to determine with which protocol a particular frame was sent over, switching device 252 could be, among other implementations, a custom field programmable gate array (FPGA) or application-specific integrated circuit (ASIC).

It should be noted that combinations of the network data type indicia recited above, as well as other network data type indicia that have the property of indicating, in a broad sense, the type of data being transmitted on the network, could be used in addition to or in place of the network data type indicia described above.

Data may be sent from the microcontroller 230 by either or both ports 238A and 238B. If all data is sent from one port, then the switching device 252 and packet filtering device 254 essentially act as pass through devices for data to the Ethernet interface 250. If data is sent by both ports 238A and 238B, then the switching device may order data sent from the urgent port 238A to be sent prior to data sent by the non-urgent port 238B, with packet filtering device 254 still acting as a pass through. This provides a minimal improvement in the delay of the urgent data being received by other devices, without a corresponding increase in the programming complexity of the microcontroller.

Figure 3:
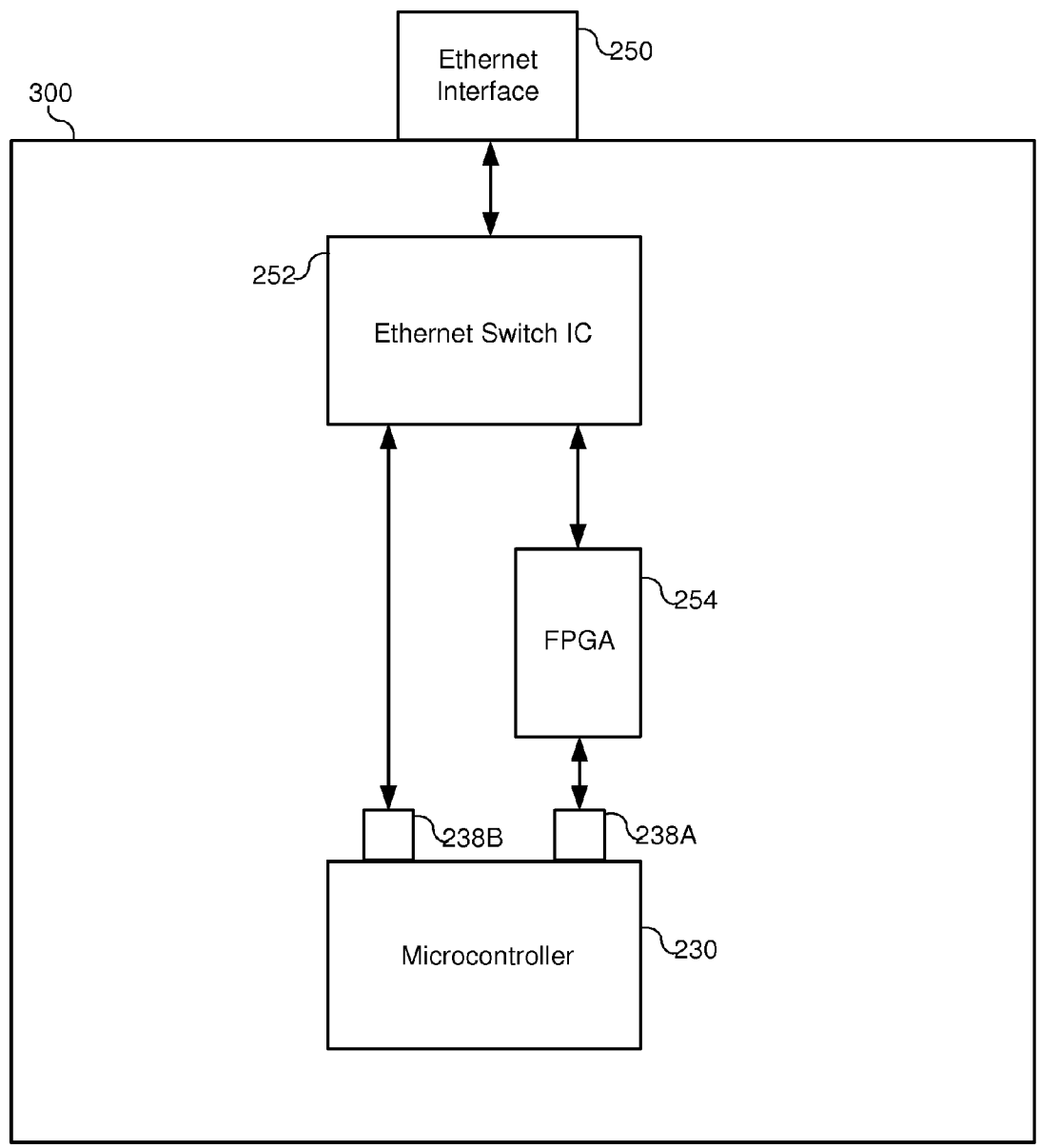
FIG. 3 is a simplified block diagram of a hardware solution to segregate network data in accordance with this disclosure.

FIG. 3 illustrates one possible communications path 300 for use within the IED 200. In particular, Ethernet interface 250 receives network data from other devices associated with a power grid. Network data is routed to an Ethernet switch IC 252. The Ethernet switch IC 252 operates to determine that network data originating from certain MAC addresses or destined for certain MAC addresses will be routed as urgent data to the first Ethernet port 238A and data that originates from other MAC addresses or is destined for other MAC addresses will be routed as non-urgent data to the second Ethernet port 238B.

As Ethernet is a broadcast network, messages received by IED 200 may not be intended for that IED, but rather, for another device. Accordingly, a packet filtering device 254 is used to discard any data from the urgent route that is intended for a different IED prior to delivering it to the microcontroller 230. In one embodiment of the disclosed network data segregating system, the packet filtering device is a FPGA 254 and is configured to discard any Ethernet frames that do not contain expected destination MAC addresses. This will prevent the microcontroller from examining, on an expedited basis, urgent communications intended for another IED.

In certain systems, data may be urgent with regards to certain devices, but not with regards to other devices. Accordingly, data generated from a particular MAC address should be handled urgently by some devices, but not by other devices. Accordingly, in another embodiment the packet filtering device 254 can be adapted to advantageously filter Ethernet frames on the source MAC address, to determine if the frame originated from a set of urgent MAC addresses, where the set can be configured on a device by device basis.

Certain embedded protocols may also include indications that data is urgent. Accordingly, packet filtering device 254 can be adapted to advantageously utilize embedded protocol information. One such example would be the IED 61850 GOOSE APP ID field, and the packet filtering device 254 can be adapted to only pass Ethernet frames where with a GOOSE APP ID field that has certain characteristics.

It should also be noted that combinations of the above recited filtering indicia could be utilized. For example, the packet filtering device 254 could examine both the Ethernet frame destination MAC address as described above, as well as the GOOSE APP ID field. Furthermore, more complicated filtering schemes could be used as well. For example, the packet filtering device 254 could initially filter on Ethernet frame destination MAC address and GOOSE APP ID field, but, after receiving at least one frame that met the required criterion, could then use the source MAC address of the received Ethernet frame to treat all frames generated by the corresponding device as urgent.

Data may be sourced from the microcontroller by either or both of urgent port 238A and non-urgent port 238B. If data is sourced from only one port, then FPGA 254 and Ethernet Switch IC 252 effectively act as pass through devices for data sourced by microcontroller 230. However, if data is sent from both ports 238A and 238B, the Ethernet switch IC 252 may be adapted to order data received from urgent port 238A so that it is sent before data received from non-urgent port 238B, thereby providing a slight improvement in the delay with which urgent data will be received by other devices, without any additional complexity in programming of the microcontroller.

Figure 4:
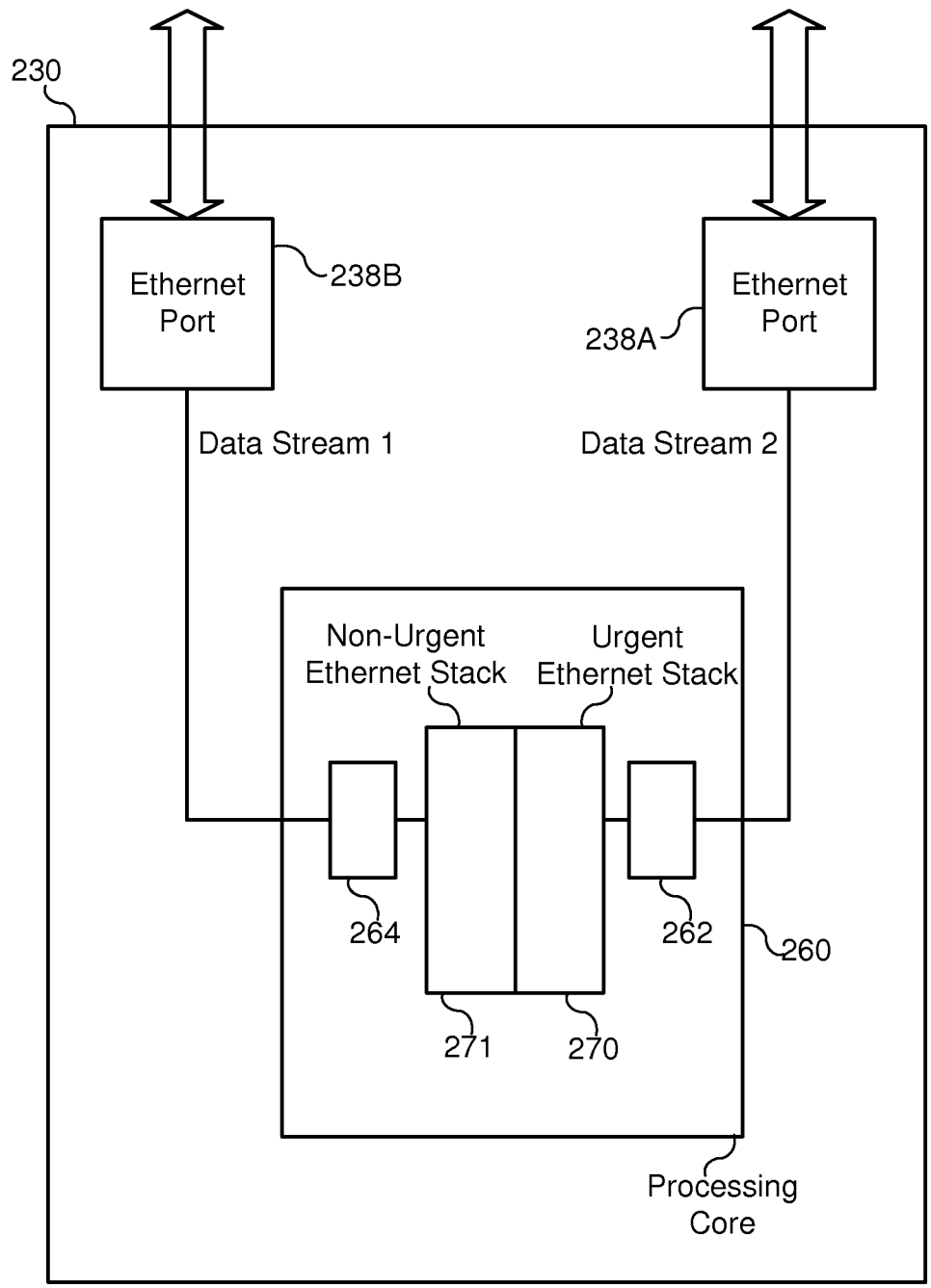
FIG. 4 is a simplified block diagram illustrating hardware and software components within a microcontroller used to segregate network data in accordance with this disclosure.

FIG. 4 depicts a simplified block diagram of hardware and software components within a microcontroller used to implement a network data segregation system in accordance with an embodiment of this disclosure. Ethernet frames are received on Ethernet ports 238A and 238B, which may be integrated into microcontroller 230 as depicted. After being received, frames are directed to the processing core 260, where urgent frames received by port 238A are buffered in a first memory buffer 262, while non-urgent frames received by port 238B are buffered in a second memory buffer 264. Memory buffers 262 and 264 may be implemented as, for example, a software FIFO, or some other data structure. The contents of memory buffer 264 is then directed to non-urgent Ethernet stack 271. The contents of memory buffer 262 is directed to urgent Ethernet stack 270, which is optimized for processing urgent communications data. The contents of either buffer may be directed frame by frame, or a block of frames may be copied at once.

Contents of the urgent frame buffer 262 are handled on an expedited basis. One way this may be accomplished would be to generate an interrupt every time a frame is received by Ethernet port 238A, and to handle processing of the frame within an interrupt handler. However, other scheduling mechanisms could be used as well to ensure that urgent frames are handled on an expedited basis.

Urgent Ethernet stack 270 and non-urgent Ethernet stack 271 may be programmed to send data using either or both of ports 238A and 238B. If programmed to send data using one port, then both urgent data and non-urgent data is sent using the same port. Generally, if one port is used, urgent data will be sent immediately, while non-urgent data will be buffered until all urgent data has been sent. However, if both ports are used, both urgent, and non-urgent data may be sent immediately, with the ordering handled by the switching device (not depicted in FIG. 4).

Figure 5:
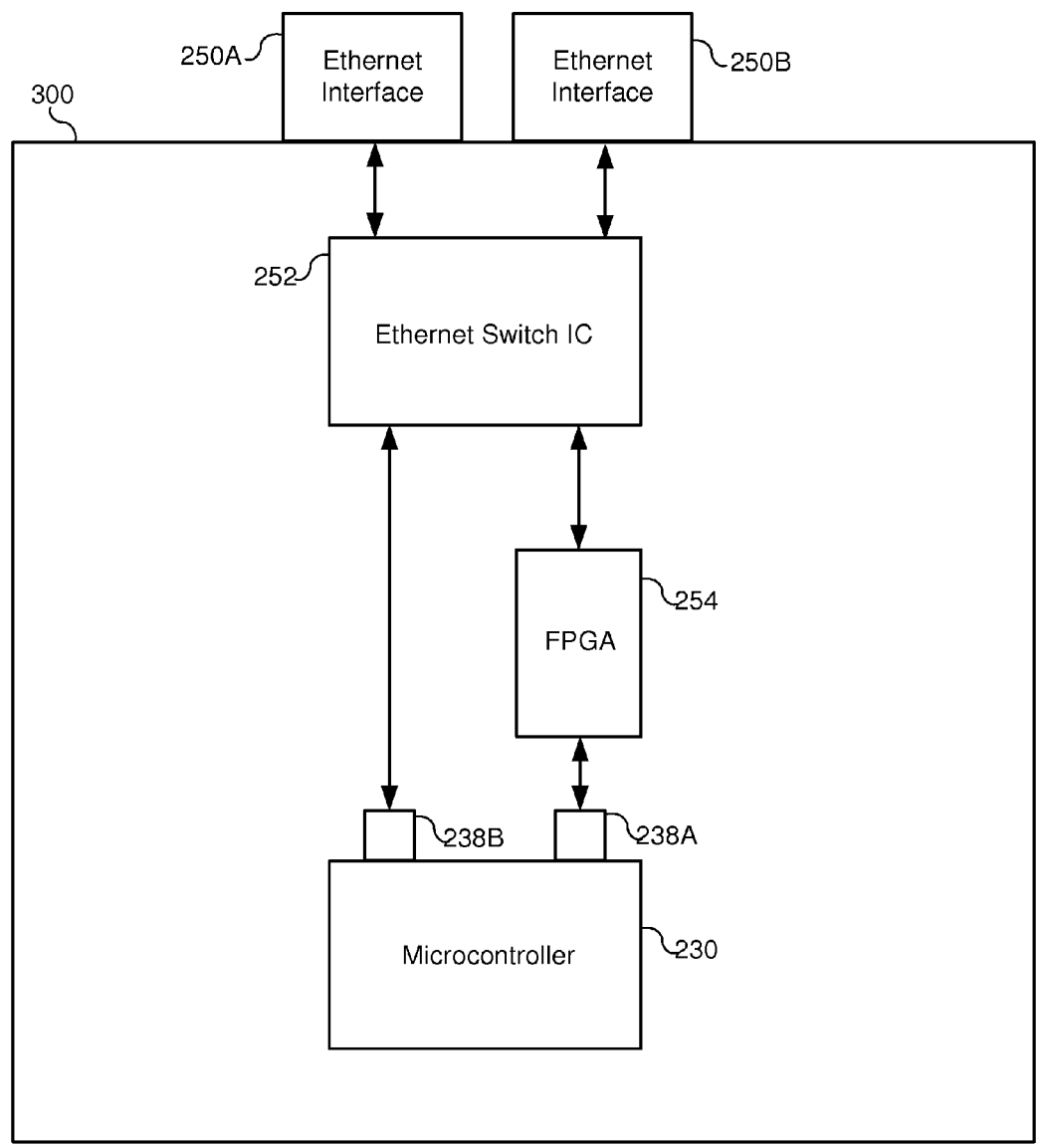
FIG. 5 is a simplified block diagram of a hardware solution to segregate network data in accordance with this disclosure and using multiple external network ports.

FIG. 5 depicts an alternate embodiment of the disclosed network data segregation system, including a pair of external Ethernet interfaces, as opposed to the single network interface depicted in FIGS. 1-4. In particular, Ethernet interfaces 250A and 250B receive network data from other devices associated with a power grid. Network data is routed to an Ethernet switch IC 252. The Ethernet switch IC 252 operates to determine that network data originating from certain MAC addresses is routed as urgent data to the first Ethernet port 238A and data that originates from other MAC addresses is routed as non-urgent data to the second Ethernet port 238B. The remainder of this figure operates similarly to the embodiment described in the text corresponding to FIG. 3.

It should be noted that data can be received and transmitted by either or both external Ethernet interfaces, with the Ethernet switch IC 252 operating as a general Ethernet switch or as a failover switch, using one external Ethernet interface until a failure is detected, and then switching to the other external Ethernet interface. It should also be noted that while two external network ports are depicted in FIG. 5, a person of skill in the art will realize that the disclosed network data segregation system and method may be extended to an arbitrary number of external network ports.

It should be noted that while Ethernet is depicted in the figures and referred to throughout this specification, a person of skill in the art will realize that other physical networking mediums could be used as well. For example token ring networks, such as ARCNET and FDDI could be used with the disclosed network data segregation apparatus, systems and methods.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method of operating within an intelligent electronic device for optimizing the handling of network data for the intelligent electronic device, the intelligent electric device including an external network interface, a switching device, a filter, and a microcontroller comprising a first internal network port, and a second internal network port separate from the first internal network port, the method comprising the steps of:
   i) receiving a plurality of network data frames at the external network interface;
   ii) examining the contents of a particular network data frame to determine network data type indicia of the particular network data frame;
   iii) directing the particular network data frame to the first internal network port when the underlying protocol of the network data frame indicates that the network data frame is of an urgent nature for handling by the microcontroller on an expedited basis, and to the second internal network port when no urgent nature is indicated; and,
   iv) filtering network data frames directed to the first internal network port and discarding any network data frames not intended for the intelligent electronic device;
wherein the microcontroller is configured to receive signals from an electric power system and monitor current and voltage channels of the electric power system and to control circuit breakers that protect the electric power system.

2. The method of claim 1 further comprising the step of directing the particular network data frame to the second internal network port if the underlying protocol of the network data frame indicates that the network data frame is of a non-urgent nature.

3. The method of claim 1 further comprising the step of directing the particular network data frame to the first internal network port if a network address of the particular network data frame indicates an urgent network source.

4. The method of claim 1 wherein the step of filtering the network data frames further comprises determining if the network data frames originated from a set of urgent network addresses.

5. The method of claim 1 further comprising the step of directing the particular network data frame to the first internal network port if the network data frame contains control data.

6. The method of claim 1 wherein the external network interface is an Ethernet interface.

7. The method of claim 6 wherein the switching device comprises an Ethernet switch integrated circuit, and wherein the step of directing is performed by the Ethernet switch integrated circuit.

8. The method of claim 6 further comprising the step of directing the particular network data frame to the first internal network port if an Ethernet MAC address of the network data frame indicates an urgent network source.

9. The method of claim 6 wherein the underlying protocol of the network data frame indicates IEC-61850 GOOSE data.

10. The method of claim 7 wherein the packet filtering circuit is disposed between the external network interface and the first network port.

11. The method of claim 10 wherein the packet filtering circuit is a FPGA.

12. The method of claim 1 wherein handling by the microcontroller on an expedited basis comprises processing data received by the first internal network port before processing data received by the second internal network port.

13. An intelligent electronic device comprising:
   i) an external network interface adapted to receive network data;
   ii) a first internal network port of a microcontroller;
   iii) a second internal network port of the microcontroller, separate from the first internal network port;
   iv) a switching circuit in electrical communication with the external network interface, the first internal network port, and the second internal network port, wherein the switching circuit examines the network data for a network data type indicia and routes the network data to the first internal network port when the network data type indicia is indicative of an urgent network source for handling by the microcontroller on an expedited basis, and to the second internal network port when no urgent nature is indicated;
   v) a packet filtering circuit adapted to discard any data routed to the first internal network port not intended for the intelligent electronic device;
   vi) one or more transformers adapted to examine a channel of voltage or current;
   vii) an input in communication with an electric power system for receiving signals therefrom; and
   viii) a microcontroller configured to receive the signals from the electric power system and monitor current and voltage channels of the electric power system and to control circuit breakers that protect the electric power system.

14. The intelligent electronic device of claim 13 wherein the switching circuit routes data to the second internal network port if the network data type indicia is indicative of a non-real time network source.

15. The intelligent electronic device of claim 13 wherein the network data type indicia indicates a network address or indicates a particular underlying protocol.

16. The intelligent electronic device of claim 13 wherein the packet filtering circuit is further adapted to discard any data routed to the first internal network port and not originating from a set of urgent network addresses.

17. The intelligent electronic device of claim 13 wherein the network data type indicia indicates control data.

18. The intelligent electronic device of claim 13 wherein the external network interface is an Ethernet interface.

19. The intelligent electronic device of claim 18 wherein the switching circuit is an Ethernet switching circuit.

20. The intelligent electronic device of claim 18 wherein the network data type indicia is an Ethernet MAC address.

21. The intelligent electronic device of claim 18 wherein the network data type indicia indicates IEC-61850 GOOSE data.

22. The intelligent electronic device of claim 19 wherein the packet filtering circuit is coupled to the external network interface, the first internal network port and the first internal network port, and wherein the packet filtering circuit discards any data from a real time network source not intended for the intelligent electronic device.

23. The intelligent electronic device of claim 22 wherein the packet filtering circuit is a FPGA.

\* \* \* \* \*